United States Patent Office 3,332,999
Patented July 25, 1967

3,332,999
PROCESS FOR PREPARATION OF AMINE OXIDES
Lawrence C. Mitchell, Clawson, and Thomas H. Coffield, Farmington, Mich., assignors to Ethyl Corporation, New York, N.Y., a corporation of Virginia
No Drawing. Filed Dec. 10, 1963, Ser. No. 329,357
13 Claims. (Cl. 260—583)

This invention is directed to a novel process for the preparation of amine oxides. Specifically, it relates to a process for the preparation of amine oxides which comprises reacting an amine with ozone.

Amine oxides are highly desirable compounds. For example, unsymmetrical long-chain alkyl tertiary amine oxides are very useful as detergents. Their technical importance maintains a continuing interest in novel and improved methods for their preparation.

It has been proposed that amine oxides be prepared by reacting a tertiary amine with organic peroxy acids (such as peroxybenzoic acid, and peroxyacetic acid) in an organic solvent. However, peroxy acids are unstable and must be prepared immediately prior to use. Moreover, precautions must be taken to prevent their detonation. Furthermore, peroxy acids are expensive. For the above reasons, processes involving the use of peroxy acids are not of commercial importance.

A prior art process for the preparation of amine oxides comprises the oxidation of amines with Caro's acid (ammonium or potassium persulfate in sulfuric acid). Caro's acid is expensive and corrosive. Hence, processes involving its use are not employed commercially.

Another prior art method for the preparation of amine oxides comprises the oxidation of amines with hydrogen peroxide. This method has serious disadvantages. For example, when the process is carried out on a commercial scale, water must be employed as the reaction medium, since the yields are considerably diminished by a non-aqueous solvent.

Although water is the reaction medium of choice in the oxidation of amines with hydrogen peroxide, there are serious disadvantages in the use of an aqueous system. For example, it has been reported that the yield of amine oxide obtained with hydrogen peroxide is dependent upon the amount of water employed. Thus, as the amount of water is increased, the yield is decreased. However, a certain amount of water is required by the process, and, if less than an optimum amount of water is employed, the reaction mixture forms intractable gels. In order to strike a balance between the deleterious effect of water on the yield of product, and the tendency of gel formation, measured amounts of water are carefully added during the course of the reaction. This unduly complicates the process and increases the cost of formation of product.

Amine oxides are not readily separable from an aqueous reaction mixture, and this difficulty has markedly retarded the commercial development of water-free preparations of amine oxides. Moreover, it necessitates shipping amine oxides in aqueous solutions, usually of 30–40% strength. The high cost of shipping aqueous solutions is a serious economic disadvantage and unduly increases the cost of amine oxides.

Hence, a need exists for a simple economical process for the preparation of amine oxides by the oxidation of amines. The process of this invention, which employs ozone as the oxidant, satisfies this need.

Prior to our discovery, a satisfactory method for the oxidation of unsymmetrical long-chain alkyl tertiary amines with ozone did not exist. In British Patent 437,566, it is reported that lauryldimethylamine can be oxidized with ozone in the presence of dilute sulfuric acid. Since an aqueous system is employed in this process, it has the same disadvantages noted above.

The British patent teaches that the ozonization can be carried out in the presence of chloroform or acetone. Chloroform is not desirable because of its toxicity. Moreover, it has a high specific gravity and, therefore, a large amount must be employed to obtain the desired volume of reaction medium. This makes the process too expensive. Likewise, acetone is too expensive to be employed in a competitive commercial process.

On page 202 of "Ozone Chemistry and Technology," infra, it is reported that amines such as tri-n-heptylamine and N-ethyl piperidine can be oxidized with ozone in the presence of an alcohol at Dry Ice temperatures. In contrast, we have discovered that high yields of amine oxides are obtained when amines are oxidized with ozone in the presence of an alcohol at much higher temperatures. It has also been discovered that a negligible amount of ozone reacts with the alcohol solvent, even when comparatively high temperatures are employed. The negligible amount of alcohol oxidation with ozone is surprising since it is well known that alcohols are readily oxidized by a wide variety of oxidants.

The process of this invention is carried out at from about 1° to about 40° C. Since it is not necessary to drastically cool our reaction mixtures, our process is economically advantageous. Moreover, our process employs only stable starting materials and yields water-free amine oxides in a simpler manner than heretofore possible. For the above reasons, the process of this invention is admirably suited as a commercial method for the preparation of amine oxides.

An object of this invention is to provide a process for the preparation of amine oxides which employs ozone as the oxidant. Another object is to provide a process comprising the oxidation of amines with ozone in a non-aqueous solvent at a comparatively high temperature. Additional objects will be apparent from the following detailed description and appended claims.

The objects of this invention are satisfied by providing a process which comprises reacting ozone with an amine in the presence of a lower alcohol as a reaction medium, at a temperature of from about 1° to about 40° C. A preferred embodiment is a process for the preparation of an amine oxide, which comprises reacting ozone with an amine having the formula $R_1R_2R_3N$, wherein $R_1$ is an acyclic alkyl radical having from 10 to about 20 carbon atoms, and $R_2$ and $R_3$ are alkyl radicals having from 1 to about 4 carbon atoms; said process being carried out in the presence of a saturated alcohol having from 1 to about 4 carbon atoms as a liquid reaction medium, and at a temperature within the range of from about 1° to about 40° C.

Although any tertiary amine in which the amino nitrogen atom is the primary reactive site man be oxidized to the corresponding amine oxide by our process, we prefer to employ amines which yield amine oxides having detergent or cleansing properties. Examples of amine oxides of this type which can be prepared by the process of this invention include lauryldimethylamine oxide, myristyl dimethylamine oxide, oleyl dimethylamine oxide, lauryl methyl ethyl amine oxide, cetyl diethylamine oxide, lauryl dipropylamine oxide, cetyl methyl isopropyl amine oxide, and the like.

Mixtures of amine oxides can be prepared by oxidizing mixtures of amines according to our process. Thus, "coconut dimethylamine oxide" can be prepared by reacting the amines prepared from middle-cut coconut alcohol or fatty acid. The alkyl or acyl radical derived from middle-cut coconut fatty acid has approximately the following chain length composition: 2% $C_{10}$, 66% $C_{12}$, 23% $C_{14}$, and 9% $C_{16}$.

Pure ozone can be employed in our process; however, it is not necessary. We frequently employ ozone in the presence of a carrier gas. For example, we employ a mixture of ozone and air or ozone mixed with nitrogen, argon or similar inert gases. The preparation of ozone mixtures of this type is discussed on pages 44–52 of "Ozone Chemistry and Technology," Advances in Chemistry Series, No. 21, Am. Chem. Soc. (1959). Preferably, we employ a stream of ozone and oxygen from an ozone generator. The percentage of ozone in the gaseous mixture employed is not critical. We usually employ mixtures containing from about 20 to about 70 milligrams of ozone per liter.

Our process is carried out using a lower alcohol as a liquid phase reaction medium. Preferred alcohols have from 1 to about 4 carbon atoms and do no contain any carbon-to-carbon unsaturation. Typical saturated alcohols we employ are methanol, ethanol, isopropanol, n-butanol, isobutanol, and the like. Besides the monohydric alcohols exemplified above, polyhydric alcohols such as ethyleneglycol and glycerol can be employed if desired. Preferred alcohols have a boiling point below about 100° C., preferably below about 85° C. Highly preferred alcohols are ethanol and methanol. Methanol is very highly preferred.

Sufficient alcohol should be employed to provide a readily fluid reaction mixture. Generally, a weight of alcohol amounting to at least the weight of the amine reactant is required, and, in most cases, at least twice this amount is desirable. Up to 20 to 30 or more times the weight of the amine reactant can be employed, if desired.

Our process can be carried out by contacting a molar equivalent ratio of amine and ozone, but it is not necessary to do so. Thus, good results are obtained if a slight excess of amine is employed, for example, from about 1.15 moles of amine per mole of ozone. However, in many instances, higher yields of product are obtained if a slight excess of ozone is used. In general, we prefer to employ from about 1 to about 1.7 moles of ozone per mole of amine. Greater excesses of ozone, such as two or three or more moles per mole of amine, can be employed if desired. However, significant advantages are not obtained in most instances.

The ozonization of the amine can be carried out at atmospheric, superatmospheric, or subatmospheric pressure. The exact pressure employed is not critical and, in most cases, the reaction is effectively carried out at substantially atmospheric pressure.

In general, our process is carried out at a temperature within the range of from about 1° to about 40° C. However, somewhat higher and somewhat lower temperatures can be employed if desired. A preferred temperature range is from 1° to about 30° C. Preferred temperatures are ambient temperature, ca. 20–22° C., and temperatures within the range of from about 1° to about 15° C.

Our process is carried out by contacting an amine and ozone in a reaction medium of the type specified above at the desired pressure and temperature. The method of contacting the reactants is not critical and any method known in the art can be employed. We usually premix the amine with the reaction solvent in a suitable reaction vessel and then pass ozone or an ozone-containing gaseous mixture into the resultant liquid.

As discussed above, a prime feature of this invention is the use of a nonaqueous system. Some water can be tolerated in our reaction mixtures; however, its presence usually offers no material advantage. In fact, in some instances, a large amount of water decreases the yield of product. In general, we prefer to use reaction mixtures which contain less than about 10% water. In highly preferred reaction systems, the only water is that present as an impurity in the reactants and reaction medium. In other words, the process of this invention is preferably carried out under substantially anhydrous conditions.

The reaction systems employed in our process can contain other ingredients besides the reactants and the alcohol. Thus, in some instances, it is particularly advantageous to carry out the reaction in the presence of a catalyst. Suitable catalysts for this reaction are acids having an ionization constant (in water) of at least about $10^{-5}$. In general, both organic acids and inorganic acids can be employed. Thus, all acids of the desired acidity that are compatible with the reactants and products can be employed. An acid is compatible unless it decreases the yield of amine oxide by a side reaction with either the reactants or the product. Compatible acids contain nonreactive anions which are stable under the reaction conditions employed.

Preferred organic acids are carboxylic acids having a melting point below about 80° C. Saturated, unsubstituted aliphatic carboxylic acids are preferred. However, aliphatic carboxylic acids which are substituted with radicals that are inert toward ozone can be employed if desired. Illustrative but nonlimiting examples of the organic acids we employ in our process are acetic acid, propionic acid, caprylic acid, chloroacetic acid, trichloroacetic acid, $\beta$-chloroproponic acid, lactic acid, glycolic acid, malonic acid, formic acid, and the like. Highly preferred acids have less than about 9 carbon atoms. Very highly preferred organic acids are acetic and trichloroacetic acid.

Typical inorganic acids which can be employed in our process are sulfuric acid, metaphosphoric acid, triphosphoric acid, pyrophosphoric acid, orthophosphoric acid, and the like. In general, an amount of acid between about 0.0001 and 0.3 mole, per each mole of amine, is employed. In other words, from about 0.01 to about 30% of a molar equivalent of an acid, based on the number of moles of amine reactant charged, is employed.

Lewis acids can be employed as catalysts in the process of this invention. Preferred Lewis acids are salts having electrophilic characteristics. Preferred salts of this type are the halides of the metals of Groups IIA, IIB, IIIA, IVB, VB, VIB, VIIB, and VIII of the Periodic Table. Highly preferred halides are halides of Groups IIIA, VIB, and VIII metals. Illustrative but nonlimiting examples of preferred metal halides are boron trifluoride, boron trichloride, boron tribromide, aluminum trichloride, aluminum tribromide, titanium tetrachloride, titanium tetrabromide, ferric chloride, and the like. Other halides of generally lesser activity are the halides of zinc, gallium, magnesium, zirconium, vanadium chromium, manganese, and cobalt. In some instances it is desirable to employ the corresponding hydrohalide along with the metal halide; e.g., a boron trichloride hydrogen chloride catalyst system. Noble metal halides, i.e., the halides of palladium, rhodium, iridium, and platinum, can also be employed. Illustrative but nonlimiting examples of these catalysts are platinum dichloride, platinum dibromide, palladium dichloride, palladium dibromide, iridium tribromide, iridium dichloride, iridium trichloride, iridium tetrachloride, rhodium trichloride, rhodium tribromide, and the like. Other catalysts that can be employed are vanadic, tungstic, and molybdic acid.

In general, the amount of the above catalysts employed is between about 0.0001 and 1.0 mole per each mole of amine reactant. A preferred range is from about 0.01 to about 0.3 mole per each mole of amine.

The amine oxide product can be recovered from the reaction mixture by any method known in the art. The product may be recovered by distilling off the reaction medium. In many instances, the amine oxide product is somewhat unstable and the distillation of the reaction medium must be accomplished at reduced pressures and low temperatures to avoid decomposition of the product. In some instances the addition product of an acid and the amine oxide is more stable than the amine oxide itself. The amine oxide can be converted to the addition product by reaction with a suitable acid. Preferred acid addition salts are prepared from hydrochloric acid.

The amount of ozone admitted to the reaction zone can be determined by any method known in the art. For example, when a stream of ozone and oxygen is employed, the concentration of the ozone can be determined by the difference in thermal conductivity of the ozone-oxygen mixture as compared with the conductivity of pure oxygen. Multiplication of the concentration of ozone and the total volume of gas admitted yields the amount of ozone admitted to the reaction zone.

In order to keep the cost of formation of product to a minimum, the flow of ozone through the liquid reaction medium is preferably regulated so that the ozone added is completely reacted with the amine. A convenient method for determining if the ozone is being completely utilized is the passage of the effluent gaseous stream through an aqueous potassium iodide tower. Any ozone which is not utilized in the reaction oxidizes the iodide to free iodine. The presence of free iodine can be quantitatively estimated by titration with sodium thiosulfate according to the method in Scott's Standard Methods of Chemical Analysis, volume 1, page 279. In the reactions reported in the following examples, the effluent gaseous stream is led from the reflux-condensing means to the potassium iodide tower.

The following illustrative and nonlimiting examples further describe the process of this invention. In the examples, all parts are by weight unless otherwise indicated.

Example I

Lauryldimethylamine, 8.52 parts, and 237 parts of anhydrous methanol was charged to a reaction vessel equipped with gas inlet means, stirring means, and reflux condensing means. A stream of oxygen and ozone (31.0 mg. of ozone per liter) was introduced into the liquid reaction mixture for about 90 minutes. The total amount of ozone introduced was 1.89 parts. During the reaction, the temperature of the reaction mixture was maintained between 1° and 3° C.

After the reaction was completed, the reaction mixture was allowed to warm to room temperature, under nitrogen, and then was transferred to a 500 ml. volumetric flask. The flask was diluted to the mark with additional anhydrous methanol.

A 475 ml. portion of the resultant solution was evaporated to dryness at room temperature and at about 20 mm. Hg. The residue was further distilled at room temperature and at full pump vacuum, ca. 0.1 mm. Hg for approximately 15 hours. Lauryldimethylamine oxide, 7.88 parts, was obtained. The product was identified by infrared spectrophotometry.

A 4.54 part portion of the lauryldimethylamine oxide was further purified by dissolving in 100 parts of water and 18 parts of concentrated hydrochloric acid. The resulting solution was extracted three times with a total of 122.5 parts of ether. The aqueous layer was neutralized with 25% potassium hydroxide and treated with solid potassium carbonate until a precipitate was formed. The mixture was extracted three times with a total of 262.5 parts of chloroform.

After drying the chloroform layer with magnesium sulfate, the mixture was filtered and the magnesium sulfate washed with additional chloroform. The washings were combined with the chloroform extracts and evaporated to dryness. The residue was dried at full pump vacuum. Purified lauryldimethylamine oxide, 3.94 parts, was obtained. The product was identified by infrared spectrophotometry.

Example II

Lauryldimethylamine, 8.52 parts, in methanol, was treated with 2.62 parts of ozone according to the procedure of Example I. The ozone was added over a period of 130 minutes. The concentration of ozone in the gaseous stream was 30.5 mgs. of ozone per liter and the reaction temperature was 23–25° C. Lauryldimethylamine oxide, 7.57 parts, was obtained.

The amount of lauryldimethylamine oxide produced was determined by a titration procedure. In the procedure, an aliquot of the resultant reaction mixture was diluted with isopropanol and treated with methyl iodide to transform any unreacted lauryldimethylamine to the corresponding quaternary base. The lauryldimethylamine oxide in the resultant mixture was then titrated with standard acid in isopropanol.

Example III

Lauryldimethylamine, 25.56 parts, and about 118 parts of anhydrous methanol were charged to a suitable reaction vessel equipped with gas inlet means, stirring means, and reflux condensing means. An ozone-oxygen stream containing 33.7 mgs. of ozone per liter was introduced into the liquid mixture for six hours and 35 minutes while maintaining the reaction temperature at 4–5° C. The total amount of ozone added was 8.28 parts.

Titration of the reaction mixture as in Example II demonstrated that 18.9 parts of lauryldimethylamine oxide was produced.

Similar results are obtained when ozone-oxygen streams having 20 and 70 mg. of ozone per liter are employed.

Example IV

In a suitable reaction vessel equipped with gas inlet means, stirring means, a thermometer, and reflux condensing means, was placed 8.52 parts of lauryldimethylamine in about 237 parts of absolute ethanol. The resultant solution was cooled with an ice bath and, while maintaining the solution temperature at 1–4° C., an ozone-oxygen stream was bubbled into the mixture for two hours and fifteen minutes. The concentration of ozone in the gaseous stream was 31 mg. per liter and the flow rate was 0.025 cu. ft./min. The total amount of ozone reacted was 2.80 parts. Titration, according to the procedure in Example II, demonstrated that 5.79 parts of lauryldimethylamine oxide was prepared.

Similar results were obtained when the concentration of ozone was 57 mg. of ozone per liter and 47 mg. of ozone per liter.

Example V

Following the procedure of Example I, 9 parts of coconut dimethylamine is reacted with about 3 parts of ozone (in an ozone-oxygen stream) at 30° C. After the reaction is completed, the liquid reaction mixture is allowed to warm to room temperature and the methanol removed by distillation under reduced pressure and at room temperature. Coconut dimethylamine oxide is obtained.

Example VI

Following the procedure of Example V, coconut dimethylamine is reacted with ozone in the presence of 250 parts of isopropanol and 250 parts of n-butylalcohol at a temperature of 40° C. Coconut dimethylamine oxide is obtained by distillation of the solvent at 40° C. and 50 mm. Hg pressure.

Example VII

Myristyl dipropylamine, one mole, is charged to a suitable reaction vessel with 500 parts of isopropanol and 300 parts of methanol. A total of 1.7 moles of ozone in an ozone-air mixture is bubbled into the mixture at 10° C. Myristyl dipropylamine oxide is obtained by distillation of the solvent under reduced pressure at room temperature.

Example VIII

Laurylmethylethyl amine, one mole, is reacted with 1.7 moles of ozone at 25° C. in the presence of isopropanol. Laurylmethylethylamine oxide is obtained by removal of the reaction mixture under reduced pressure and at a temperature of 35° C.

Example IX

Cetyl diethylamine, one mole, in 10,000 parts of methanol, is reacted with 1.2 moles of ozone according to the procedure of Example I at 35° C. Cetyldiethylamine oxide is obtained. Substitution of lauryldibutylamine and cetylmethylisopropylamine for cetyldiethylamine yields lauryldibutylamine oxide and cetylmethylisopropylamine oxide respectively.

Example X

Lauryldimethylamine, 8.52 parts, 237 parts of anhydrous methanol, and one drop of concentrated sulfuric acid (sp. gr. 1.87) is charged to a reaction vessel equipped with gas inlet means, stirring means, and reflux condensing means. Ozone, 1.89 parts, in an ozone-oxygen stream, is bubbled through the liquid reaction mixture over a period of 80 minutes while maintaining the reaction mixture at a temperature of 1–3° C. After the reaction is completed, the reaction mixture is allowed to warm to room temperature and the sulfuric acid neutralized with sodium hydroxide. The resultant mixture is then evaporated to dryness at room temperature and about 20 mm. Hg. The solid residue, which contains lauryldimethylamine oxide and sodium sulfate, is mixed with water to form a detergent solution.

Example XI

Lauryldimethylamine, 8.52 parts, and one drop of concentrated sulfuric acid (sp. gr. 1.87) and 237 parts of methanol were charged to a suitable reaction vessel. While maintaining the temperature at 2°–5° C., a total of 2.06 parts of ozone, in an ozone-oxygen stream, was bubbled through the resultant liquid mixture for one hour and forty minutes. The flow rate of the gaseous stream was 0.0240 cu. ft./min.

After the reaction was completed, the reaction mixture was neutralized with solid potassium hydroxide and allowed to warm to room temperature. The solution was then filtered through Celite and the Celite washed with additional methanol. The filtrate and washings were placed in a 500 ml. volumetric flask and the flask diluted to the mark with additional methanol. Titration analysis indicated that an 86.5% yield of lauryldimethylamine oxide was obtained.

Example XII

Following the procedure of Example X, 8.52 parts of lauryldimethylamine and 2.5 parts of ozone are reacted in the presence of 500 parts of anhydrous methanol and 1.17 parts of sulfuric acid. The reaction temperature is 20° C. After the reaction is completed, the reaction mixture is neutralized with sodium hydroxide and a mixture of sodium sulfate and lauryldimethylamine oxide is obtained by distilling the reaction mixture at 35° C. and 50 mm. Hg. The mixture of sodium sulfate and amine oxide is mixed with water to form a detergent solution.

Example XIII

Two moles of myristyl dimethylamine in 15,000 parts of methanol are contacted with two moles of ozone in an ozone-nitrogen stream. The reaction is carried out in the presence of 0.6 mole of triphosphoric acid, and at a temperature of 15° C.

After the reaction is completed, the resultant mixture is allowed to warm to room temperature and the phosphoric acid neutralized with sodium hydroxide. The neutralized mixture is then subjected to distillation at 50 mm. Hg and at 35° C. The residue of myristyl dimethylamine oxide and sodium triphosphate is used to prepare a detergent formulation. Similar mixtures containing myristyl dimethylamine oxide are prepared by substituting pyrophosphoric acid, orthophosphoric acid, and metaphosphoric acid, for the triphosphoric acid employed in the above reaction. Good yields of product are obtained when these acids are present in a concentration equivalent to 0.15 mole of acid per each mole of amine reactant, and at reaction temperatures within the range of 10° to 30° C.

Example XIV

A mixture of one mole of cetyldimethylamine, 0.015 mole of acetic acid, and 8000 parts of anhydrous methanol is contacted with one mole of ozone in an ozone-oxygen stream at 10° C.

After the reaction is completed, cetyldimethylamine oxide is separated from the resultant reaction mixture by distillation at room temperature and 10 mm. Hg.

Similar results are obtained when trichloroacetic acid or propionic acid is substituted for the acetic acid.

Example XV

One mole of lauryldimethylamine oxide and one mole of laurydimethylamine in 30,000 parts of anhydrous methanol are contacted with one mole of ozone (in an ozone-oxygen stream) at 1°–3° C.

Subsequently, the reaction mixture is distilled at room temperature and at 20 mm. pressure. The residue contains about two moles of lauryldimethylamine oxide.

Example XVI

One mole of ozone in an ozone-oxygen stream is bubbled through a mixture comprising one mole of cetyldimethylamine, 0.01 mole of aluminum chloride, and 20,000 parts of tert-butylalcohol at a temperature of 10–13° C.

After the reaction is completed, the reaction mixture is allowed to warm to room temperature and an alcoholic solution of potassium hydroxide is added until precipitation of aluminum hydroxide is complete. The reaction mixture is filtered and the filtrate distilled at 30° C. and 50 mm. Hg. The residue, which contains cetyldimethylamine oxide and potassium chloride, is mixed with water to form a detergent solution.

The above process is repeated except that titanium tetrachloride and iron trichloride are substitued for the aluminum chloride employed. Similar results are obtained.

Example XVII

Ethanol, 20,000 parts, is saturated with carbon dioxide by bubbling a stream of carbon dioxide through the ethanol for four hours. Thereafter, one mole of myristyldiethylamine is added and the resultant mixture contacted with one mole of ozone at 1–3° C. Myristyldiethylamine oxide is isolated after the resultant reaction mixture is distilled at 20° C. and at 0.1 mm. Hg.

Similar results are obtained when tert-butylalcohol or isopropanol is substituted for the ethanol employed.

The amine oxides prepared by the process of this invention are well-known compounds and have the many utilities which are known in the art. For example, because of their surface active properties, the compounds are very useful as detergents and as foam stabilizing agents.

Thus, the products of this invention may be employed as wetting, washing, cleansing, and dispersing agents in the textile, leather, paper, and other industries. They are also useable as additives in dye baths to secure thorough dying and leveling. The products of the process of this invention are also useful in the preparation of rubber foams.

Having fully described the novel process of this invention, the products produced thereby, and their many utilities, it is desired that we be limited only within the lawful scope of the appended claims.

We claim:

1. Process for the preparation of an amine oxide, said process comprising reacting ozone with an amine having the formula $R_1R_2R_3N$ wherein $R_1$ is an acyclic alkyl radical having from 10 to about 20 carbon atoms and $R_2$ and $R_3$ are alkyl radicals having from 1 to about 4 carbon atoms; said process being carried out in the presence of a substantially non-aqueous, liquid reaction medium consisting essentially of a saturated alcohol having from 1 to about 4 carbon atoms, and at a temperature within the range of from about 1° to about 40° C.

2. The process of claim 1 wherein said reaction medium is methanol.

3. The process of claim 1 wherein said reaction medium is ethanol.

4. The process of claim 1 wherein $R_2$ and $R_3$ are identical.

5. The process of claim 1 wherein $R_2$ and $R_3$ are methyl radicals.

6. The process of claim 1 wherein said amine is lauryldimethylamine, said alcohol is methanol, and said temperature is from about 1° to about 15° C.

7. The process of claim 1 wherein said amine is dimethyl coconut amine, and said alcohol is methanol.

8. The process of claim 1 being further characterized in that said process is conducted in the presence of an acid catalyst, said catalyst being selected from the class consisting of sulfuric acid, metaphosphoric acid, triphosphoric acid, pyrophosphoric acid, and orthophosphoric acid, the amount of said catalyst being up to about 0.3 mole of catalyst per each mole of amine reactant.

9. The process of claim 8 wherein said acid is a strong inorganic acid selected from the class consisting of sulfuric acid and triphosphoric acid.

10. The process of claim 9 wherein said acid is triphosphoric acid.

11. The process of claim 9 wherein said acid is pyrophosphoric acid.

12. The process of claim 9 wherein said acid is orthophosphoric acid.

13. The process of claim 8 wherein said amine is lauryl dimethylamine, said alcohol is methanol, said catalyst is triphosphoric acid, said temperature is within the range of from about 1° to about 15° C.; said process being further characterized by an isolation procedure conducted after lauryl dimethylamine oxide is formed, said isolation comprising
   (a) the step of neutralizing said acid with alkali metal hydroxide, and
   (b) after neutralization is complete, removing said methanol by distillation under reduced pressure, at a temperature within the range of from about 10° to about 30° C.

References Cited
FOREIGN PATENTS 437,566   2/1935   Great Britain.

OTHER REFERENCES

Maggiolo et al., Ozone Chemistry and Technology, American Chemical Society, Washington, D.C. (1959) pp. 202 to 204.

CHARLES B. PARKER, *Primary Examiner.*

RICHARD L. RAYMOND, *Assistant Examiner.*